United States Patent
Ripoll et al.

(10) Patent No.: US 7,944,117 B2
(45) Date of Patent: May 17, 2011

(54) DEVICE AND METHOD FOR DRIVING AN ULTRASOUND PIEZOELECTRIC ACTUATOR

(75) Inventors: Christophe Ripoll, Viroflay (FR); Clement Nouvel, Verneuil sur Seine (FR)

(73) Assignee: Renault S.A.S, Boulogne Billancourt (FR)

( * ) Notice: Subject to any disclaimer, the term of this patent is extended or adjusted under 35 U.S.C. 154(b) by 373 days.

(21) Appl. No.: 12/296,793

(22) PCT Filed: Mar. 8, 2007

(86) PCT No.: PCT/FR2007/050892
§ 371 (c)(1),
(2), (4) Date: Dec. 10, 2008

(87) PCT Pub. No.: WO2007/116159
PCT Pub. Date: Oct. 18, 2007

(65) Prior Publication Data
US 2009/0091212 A1 Apr. 9, 2009

(30) Foreign Application Priority Data
Apr. 10, 2006 (FR) ...................................... 06 03143

(51) Int. Cl.
*H02N 2/06* (2006.01)
(52) U.S. Cl. ................ 310/317; 310/316.01; 310/316.03
(58) Field of Classification Search ............. 310/316.01, 310/316.03, 317, 318
See application file for complete search history.

(56) References Cited

U.S. PATENT DOCUMENTS

| 4,784,102 | A | 11/1988 | Igashira et al. | |
|---|---|---|---|---|
| 5,969,464 | A | 10/1999 | Nakano et al. | |
| 6,060,814 | A * | 5/2000 | Hoffmann et al. | 310/316.03 |
| 6,078,198 | A * | 6/2000 | Gerken et al. | 327/111 |
| 6,212,053 | B1 * | 4/2001 | Hoffmann et al. | 361/169.1 |
| 6,441,535 | B2 * | 8/2002 | Freudenberg et al. | 310/316.03 |
| 6,564,771 | B2 * | 5/2003 | Rueger et al. | 123/299 |
| 2001/0038256 | A1 | 11/2001 | Grehant | |

FOREIGN PATENT DOCUMENTS

| EP | 1 109 304 | 6/2001 |
|---|---|---|
| EP | 1 276 159 | 1/2003 |

OTHER PUBLICATIONS

Thompson, M. et al., "Application Of The Genetic Algorithm And Simulated Annealing To LC filter Tuning", IEE Proceedings: Circuits Devices and Systems, vol. 148, No. 4, pp. 177-182 (2001).

* cited by examiner

*Primary Examiner* — Walter Benson
*Assistant Examiner* — Bryan P Gordon
(74) *Attorney, Agent, or Firm* — Oblon, Spivak, McClelland, Maier & Neustadt, L.L.P.

(57) ABSTRACT

A device for driving ultrasound piezoelectric actuators, on the basis of a DC voltage. The device includes an impedance matching branch mounted in parallel with the actuators and including a capacitor in series with a selection switch, which is closed and opened, at the same time as the selection switch of the actuator to be excited, so that the voltage across the terminals of the matching capacitor and the voltage across the terminals of the selected actuator are almost zero before the start and after the end of the injection. A method of controlling the matching switch makes it possible to benefit from the capacitive charge during the pulse train causing the injection, while circumventing abrupt discharges at the start of the train. Such a device and method may find application to the engines of motor vehicles, as one example.

7 Claims, 4 Drawing Sheets

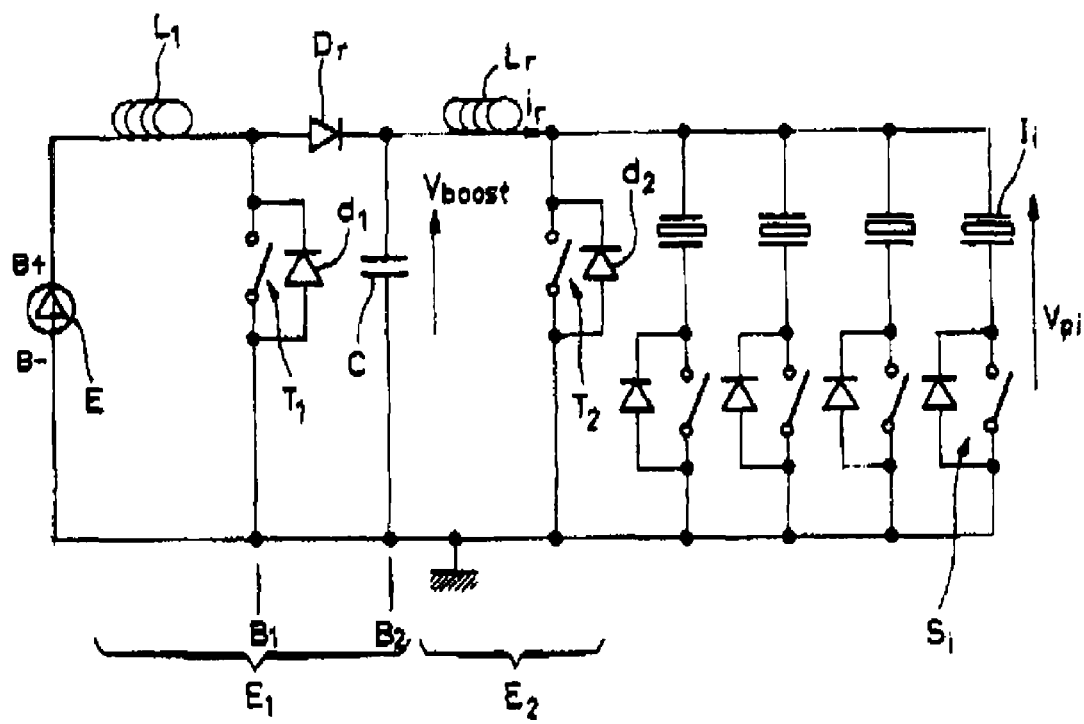
FIG_1
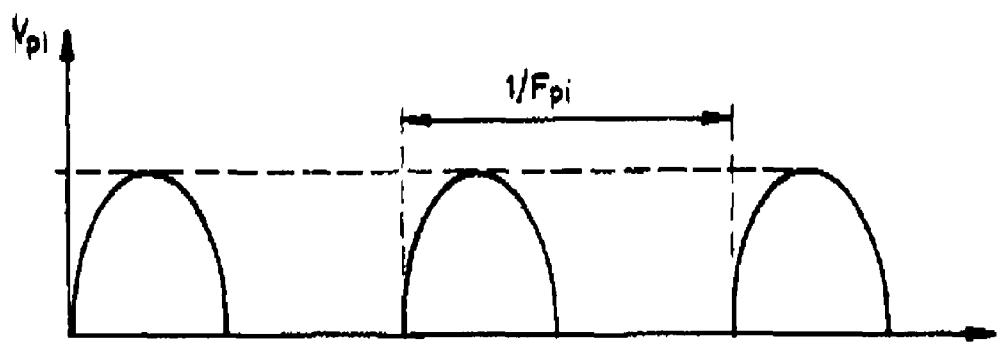
FIG_2

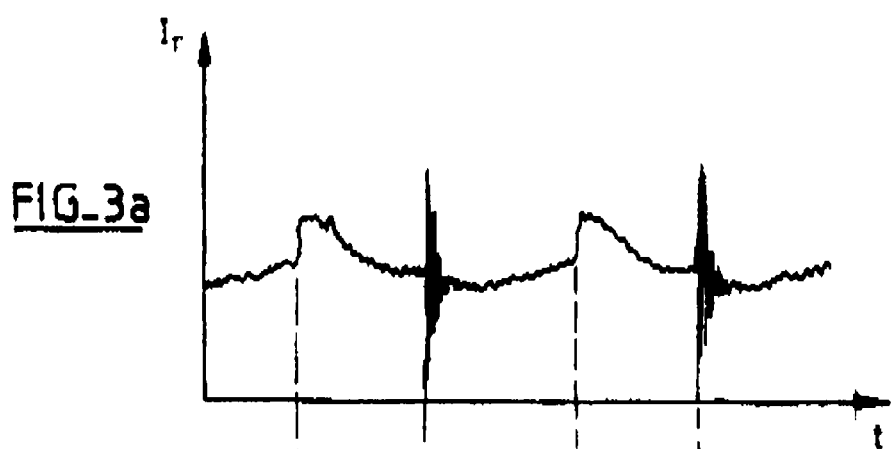
FIG_3a
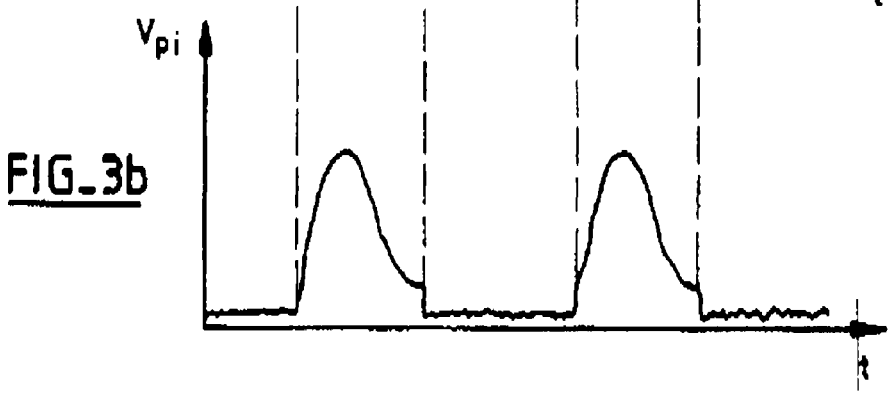
FIG_3b
FIG_4a
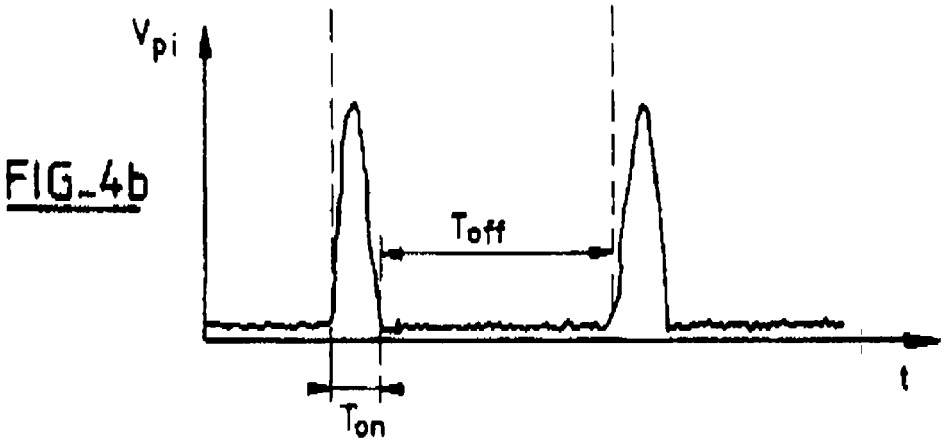
FIG_4b

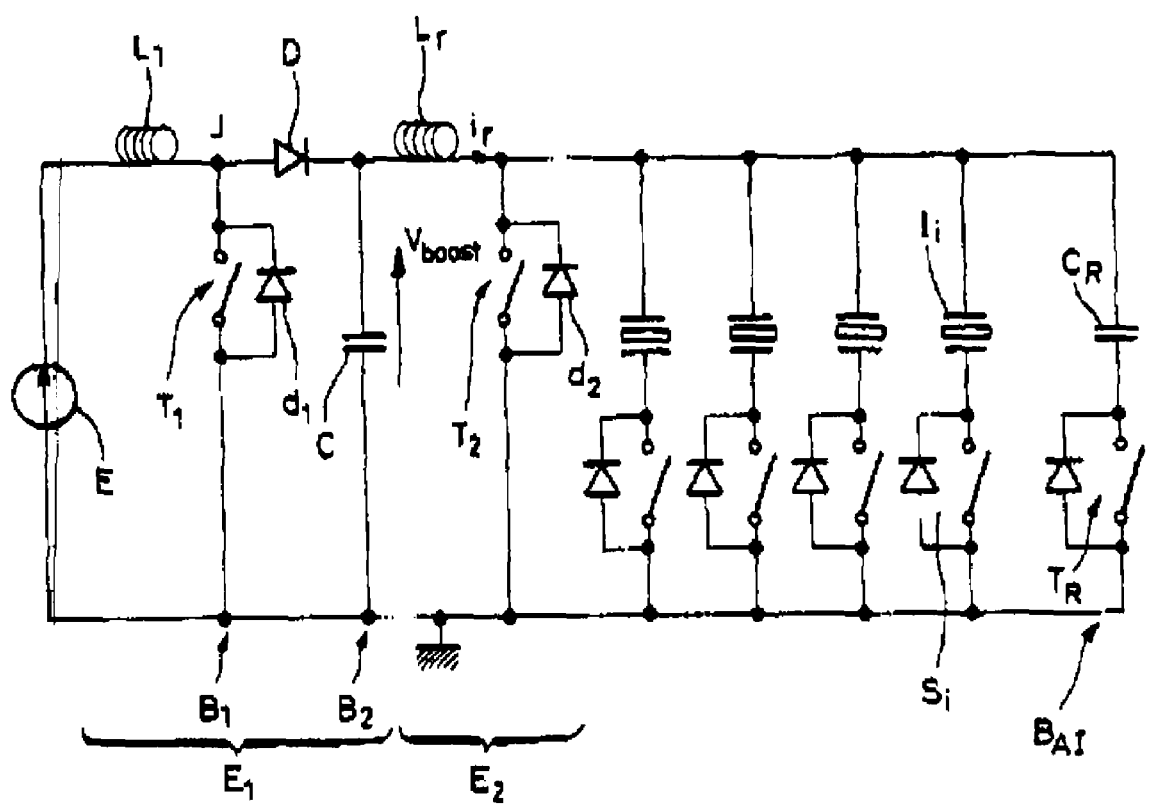
FIG_5

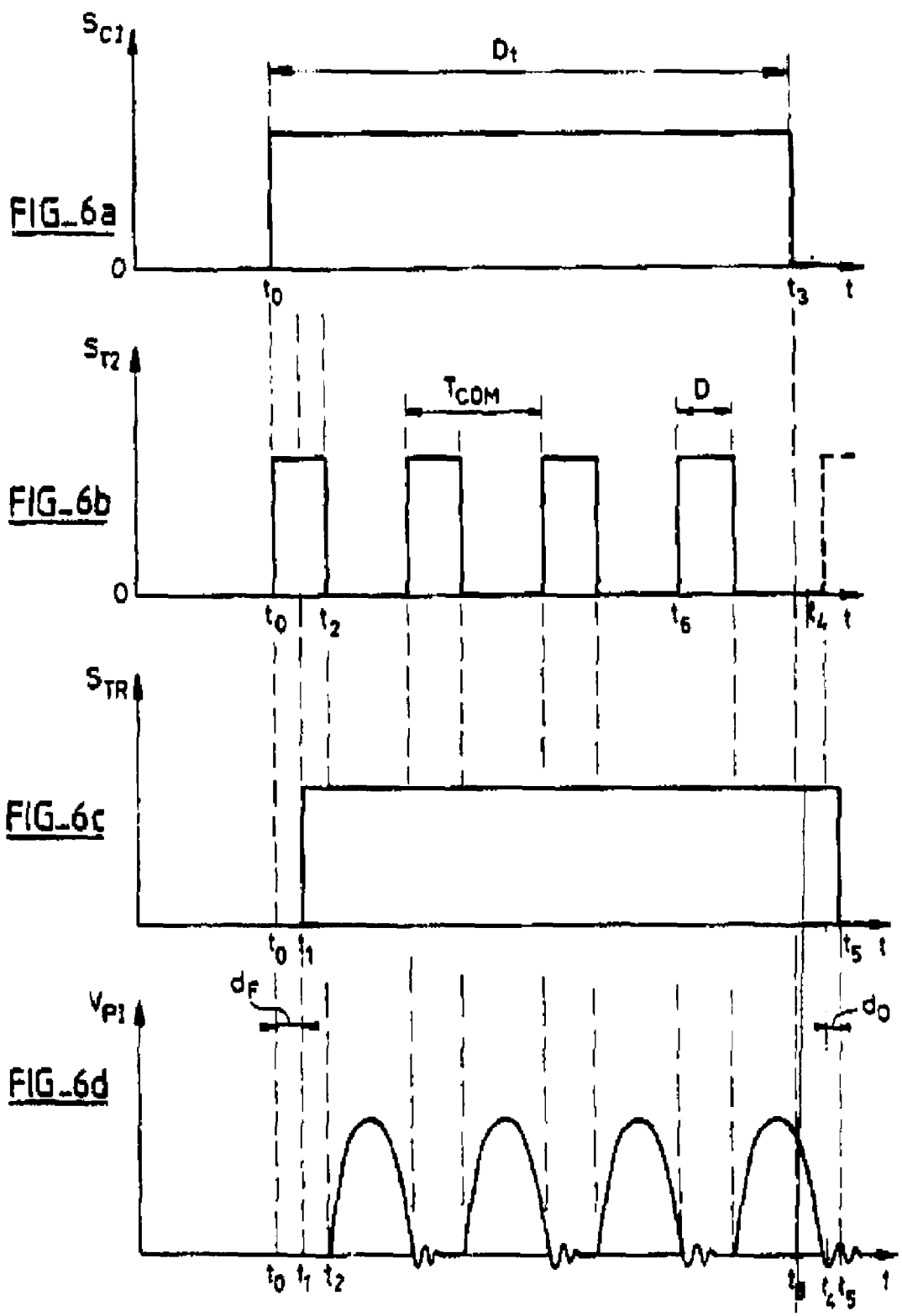

DEVICE AND METHOD FOR DRIVING AN ULTRASOUND PIEZOELECTRIC ACTUATOR

The present invention relates to a device for driving an electronically-driven ultrasound piezoelectric actuator, and more particularly a fuel injector with piezoelectric stage driven by the electronic injection computer of an internal combustion engine in a motor vehicle. It moreover relates to a method of driving such an actuator controlled by said device.

More specifically, the problem that the invention seeks to resolve is the impedance matching to optimize the control of the piezoelectric cells intended to make the structure of the ultrasound injectors vibrate, as described in the French patent application, filed under the number 99 14548 in the name of the Applicant.

Such an ultrasound injector comprises, among other things, a cylindrical nozzle fed with fuel and at the end of which is provided an injection orifice, and means of cyclically vibrating the nozzle, such as a transducer, comprising a ceramic piezoelectric stage across the terminals of which the electric voltage is varied to modify its thickness between two extreme positions corresponding to the opening and the closure of the injector, within the tolerance of a low-gearing ratio. An injector piezoelectric element is perfectly equivalent to a capacitance with a high charging voltage, greater than 100 or so volts.

This type of injector sprays the fuel very finely in droplets, calibrated to provide a precise dosage, and small enough to ensure the complete and uniform vaporization of the injected fuel. To spray the fuel more finely, an opening oscillating at ultrasound frequency is produced at the nose of the nozzle. An alternating signal of high frequency must be generated to excite the piezoelectric cells.

The driving electronic circuitry for the injectors generates a periodic high voltage $v_{pi}$, greater than 100 or so volts, and at high frequency $F_{pi}$, greater than 10 or so kHz, on a piezoelectric cell from a DC voltage source, in this case the battery of the vehicle or the output of a power DC converter, in a motor vehicle, the supply voltage has the value 12 or 42 volts, which means increasing this voltage to charge and discharge the element.

There are currently transformerless driving devices, such as that represented in FIG. 1, which is fed by a DC voltage source E, the battery of the vehicle for example, the terminal B− of which is linked to the ground and the terminal B+ of which is linked to a first amplification stage $E_1$ of said DC voltage.

The N injectors $I_i$ of an internal combustion engine, N being an integer number, generally 4, 6 or 12, are mounted in parallel and controlled in sequence by selection switches $S_j$, each mounted in series with an injector $I_i$. An electronic injection computer sends a logic control signal to each selection switch for the high voltage output of the voltage step-up converter to be correctly applied to the terminals of the selected injector.

The driving device comprises a first branch $B_1$ consisting of a first inductance $L_1$ and a chopping switch $T_1$, across the terminals of which is mounted in anti-parallel a freewheeling diode $d_1$. A first terminal of the inductance $L_1$ is linked to the DC voltage source E and the other terminal is linked to a second branch $B_2$ consisting of a rectifying diode D in series with a filtering capacitance C, across the terminals of which is delivered a high voltage $V_{boost}$ feeding a second stage $E_2$ of the step-up converter.

The second stage comprises a second inductance $L_r$ linked to a second chopping switch $T_2$ and a second freewheeling diode $d_2$ mounted in anti-parallel.

The voltage step-up converter generates a periodic high voltage $V_{pi}$, greater than 100 or so volts, with a high frequency $F_{pi}$, greater than 10 or so kHz, intended to excite the ultrasound injectors $I_i$. A temporal representation of the excitation voltage $V_{pi}$ of the injectors is the subject of FIG. 2.

The value of the inductance $L_r$ is a function of the acoustic excitation resonance of the piezoelectric actuator, so it is chosen for the inductance to be charged sufficiently to provoke a high excitation voltage $V_{pi}$, of the order of 1200 v. As for the filtering capacitance C, its dimensions are such that it has a very strong reactivity to the rise in voltage $V_{boost}$.

FIG. 2 is a representation of this free resonance between the inductance $L_r$ and the input capacitance of the selected injectors in the case where it is theoretical. However, in reality, it is dampened by the real nature of the piezoelectric injector, which leads to an observable damping of the voltage $V_{pi}$, as shown by FIG. 3b, which is a temporal representation. A non-zero voltage level is, in fact, observed at the moment when the switch $T_2$ closes, which is reflected in high oscillations on the current at its terminals, at that instant. This non-zero voltage level is linked to the damped nature of the resonance between the charge and the inductance $L_r$. It will also be noted that the current $I_r$ circulating in the injector is extremely disturbed at the time of the damping, as shown by FIG. 3a.

To obtain a zero voltage level at the moment when the switch $T_2$ switches over, which is preferable to facilitate the switchovers and therefore reduce the losses in the transistor, the value of the resonance inductor $L_r$ is reduced, from 1 MHz to 200 μH for example, and the opening time of the switch $T_2$ is reduced. Thus, it is possible to overcome this voltage damping and this current disturbance, as shown by the temporal representations of FIGS. 4b and 4a.

However, this dimensioning of the inductance $L_r$ that takes account of the critical damping of the inductance/injector assembly leads to an injector driving waveform with a duty cycle $T_{on}/T_{off}$, which is the ratio between the open time and the closed time, that is less than ½. This is a notable drawback because the displacement of the injector's sonotrode, and therefore the throughput performance of the injector, becomes all the greater when the duty cycle is equal to or greater ½.

The problem is therefore how to reduce the losses and the over-oscillations in the chopping transistor $T_2$ in the second stage at the time of its switching, while preserving the duty cycle guaranteeing the performance levels of the injector.

Currently, the piezoelectric injectors do not operate on a resonance principle, but they exhibit resonance phenomena linked to the capacitive elements, such as the stack, or inductive elements, such as the interlinking wires, which are not functional. Furthermore, they exhibit very much less high characteristic frequencies. In the patent application DE 199 31 235, in the name of SIEMENS, the invention described proposes switching capacitive charges to enhance the operation of a transient charge. The object is to change the appearance of the rising or falling edges of certain signals. However, the objective of that invention is not to perform impedance matching to control an actuator at its resonance frequency.

The aim of the invention is to overcome this drawback, by adding a capacitive charge to the terminals of each injector while it is being driven to enhance the trend of the resonance signals in favor of the chopping transistor of the second stage of the device, by reducing its thermal losses and its stresses, and in favor of the resonator, by increasing its performance. It further makes it possible to converge towards the ideal duty cycle, equal to ½, without critical damping.

For this, a first subject of the invention is a device for driving at least one ultrasound piezoelectric actuator, electronically driven from a control computer and a DC voltage source, comprising a first amplification stage for said voltage to generate a high voltage and a second stage, fed by said high voltage, for generating a current source to feed the injectors associated with selection means that can be controlled by said computer, characterized in that it moreover comprises an impedance matching branch consisting of a reactive capacitance in series with a selection switch, mounted in parallel with the actuators, said selection switch of the reactive capacitance being closed and opened, by the control computer, at the same time as the selection switch of the actuator to be excited.

According to another characteristic of the driving device, the reactive capacitance is dimensioned to increase the capacitance of the injector/reactive capacitance assembly having to resonate with the inductance of the amplification stage and supply an AC excitation voltage with a duty cycle at least equal to ½.

A second subject of the invention is a method of driving several ultrasound piezoelectric actuators, controlled by a device according to the preceding characteristics, such that the opening of the switch of the impedance matching branch is controlled at an instant later than the end-of-injection control instant and prior to the new-injection control instant, while the switch of the second stage of the driving device is no longer activated, after a time interval defined from the instant for the voltage across the terminals of the matching capacitance and the voltage across the terminals of the selected actuator to be zero or very much less than the excitation voltage of the actuators, the reactive capacitance retaining an almost zero charge between two injection trains of duration.

According to another characteristic of the driving method, it is such that the closing of the switch of the impedance matching branch must take place on the one hand after the instant of closure of the switch of the second stage of the driving device, and on the other hand before the instant of its opening, so that the time interval between the instants depends on the technology of the switch and is determined so that the voltage across the terminals of the matching capacitance and the voltage across the terminals of the selected actuator are zero or very much less than the excitation voltage of the actuators, the reactive capacitance retaining an almost zero charge between two injection trains of duration.

Other characteristics and advantages of the invention will become apparent from reading the description, illustrated by the following figures which are, in addition to the FIGS. 1, 2, 3$a$ and 3$b$, 4$a$ and 4$b$ which have already been described:

FIG. 5: the electronic diagram of an exemplary embodiment of a device for driving an ultrasound piezoelectric actuator according to the invention;

FIGS. 6$a$ to 6$d$: the temporal representation of the injection control signals and the actuator excitation voltage.

The diagram of FIG. 5 repeats the configuration of the device of FIG. 1, namely a voltage source E feeds a first amplification stage $E_1$ of this voltage, in order to generate a high voltage $V_{boost}$ across the terminals of a second stage $E_2$ for generation of a current source $i_r$ intended to feed the piezoelectric injectors $I_i$. These parallel-mounted injectors are selected by switches $S_i$ that can be controlled by the vehicle's injection computer.

The first stage for generation of a high voltage $V_{boost}$ comprises two branches, the first $B_1$ consisting of an inductance $L_1$ and a chopping switch $T_1$ in parallel with a diode $d_1$ mounted in anti-parallel.

Between the ground and the junction point J of the inductance $L_1$ with the switch $T_1$ is mounted the second branch $B_2$ consisting of a rectifying diode D in series with a filtering capacitance C across the terminals of which is delivered a high voltage $V_{boost}$ feeding the second stage $E_2$. The latter consists of a second inductance $L_r$ and a second chopping switch $T_2$. A second freewheeling diode $d_2$ is mounted in anti-parallel with the terminals of this switch $T_2$.

The essential characteristic of the invention consists in adding, mounted in parallel to the chopping switch $T_2$, an impedance matching branch $B_{AI}$, consisting of a reactive capacitance $C_H$, associated with a selection switch $T_R$ which is driven to open and close at the same time as the selection switch $S_i$ of the injector chosen by the injection computer. This additional branch consisting of a capacitance $C_R$ and a switch $T_R$ is mounted at the terminals of the injector selection branches to assist in driving them voltage-wise. Other topologies of the first two stages of the control device are applicable to the invention.

The reactive capacitance $C_R$ is dimensioned to increase the capacitance of the injector/reactive capacitance assembly that has to resonate with the inductance $1_R$ of the amplification stage and supply an AC excitation voltage $V_{pi}$ for the injectors with a duty cycle that can reach the value ½.

The invention proposes a method of controlling the switch $T_R$ of this additional branch that makes it possible to benefit from the capacitive charge during the pulse train provoking the injection, by circumventing the abrupt discharges at the start of a train. For this, the opening of the switch $T_R$ is ordered after the end-of-injection command, the chopping switch $T_2$ of the second stage of the injector driving device remaining open, after a time interval $d_o$ determined from the cancellation of the voltage $V_R$ across the terminals of the matching capacitance $C_R$ and the voltage $V_{pi}$ across the terminals of the selected injector so that the latter do not have time to rise significantly again, and the closing of the switch $T_R$ is delayed by a time interval $d_F$ relative to the closing of the switch $T_2$ for these same voltages $V_R$ and $V_{pi}$ to be almost zero at the start of injection. The matching reactive capacitance $C_R$ thus retains an almost zero charge between two injection trains of duration $D_r$, and the problem of its violent discharge is avoided.

FIG. 6$a$ represents the signal $S_{CI}$ controlling the injection of duration $D_r$, beginning at the instant $t_0$ and ending at the instant $t_3$ and FIG. 6$b$ represents the signal $S_{T2}$ controlling the second stages of the driving device, starting at the instant $t_0$ and consisting of several pulses of duration D and of period $T_{com}$, the end of injection having to be ordered during an opening pulse of the switch $T_2$, that is, when the voltage $V_{pi}$ across the terminals of the selected injector is positive.

FIG. 6$c$ represents the signal $S_{TR}$ controlling the selection switch $S_i$ of an injector and the switch $T_R$ associated with the matching capacitance $C_R$, and the voltages $V_{pi}$ across the terminals of the selected injector and $V_R$ across the terminals of the matching capacitance are represented in FIG. 6$d$. The voltage $V_{pi}$ across the terminals of the selected injector is zero or very much less than the excitation voltage $V_{boost}$, of the order of 1/10 of the latter, from the instant $t_4$ after the end-of-injection command.

The signal $S_{TR}$ controlling the selection switch $S_i$ of an injector and the switch $T_R$ of the matching branch starts at the instant $t_1$ different from the instant $t_0$ controlling the start of injection, from which it is separated by a time interval $d_F$, and their opening is ordered at the instant $t_5$ later than the instant $t_4$ of cancellation of the voltage $V_{pi}$ across the terminals of the selected injector, which would have given rise to a new injection command. These two instants $t_4$ and $t_5$ are separated by a time interval $d_0$, which must be less than 1/10 of the control period $T_{com}$ applied to the chopping switch $T_2$ of the second stage of the injector driving device.

The end-of-injection command can occur, at the instant $t_3$, only during an open phase of the switch $T_2$ of the second stage of the driving device, so the selection switch $S_i$ of an injector and the switch $T_R$ associated with the matching capacitance $C_R$ are activated on opening at the instant $t_5$, later than the instants $t_3$ and $t_4$, and earlier than a new injection command, while the switch $T_2$ is no longer activated.

Concerning the instant $t_1$ of closure of the matching switch $T_R$, it must take place on the one hand after the instant $t_0$ of closure of the switch $T_2$ of the second stage of the driving device, because its technology is not truly closed at the instant to therefore the start of injection is a little delayed, and on the other hand before the instant $t_2$ of its opening, so that the time interval $d_F$ between the instants $t_0$ and $t_1$ depends on the technology of the switch $T_2$.

According to the invention, the voltage $V_{pi}$ across the terminals of the selected injector and the voltage $V_R$ across the terminals of the matching capacitance, represented in FIG. 6d, are zero or very much less than the excitation voltage $V_{boost}$, of the order of 1/10 of the latter, on the one hand from the instant $t_4$, after the end-of-injection command, and on the other hand before the instant $t_2$ of closure of the switch $T_R$. The energy stored in the capacitance of the selected piezoelectric injector and in the matching capacitance is discharged on closure of the selection switch $S_1$ and of the switch $T_R$ at the start of injection, and when they open at the instant $t_5$, at the end of injection.

The life of the components is preserved and the thermal dissipation corresponding to the switching actions of the switches is minimized while the controlling duty cycles remains as close as possible to 1/2 to retain good injection performance characteristics.

The invention claimed is:

1. A device for driving plural ultrasound piezoelectric actuators, electronically driven from a control computer and a DC voltage source, comprising:
a first amplification stage for the voltage source to generate a high voltage;
a second stage, fed by the high voltage, for generating a current source to feed the injectors associated with a selector that can be controlled by the computer; and
an impedance matching branch including a reactive capacitance in series with a selection switch, mounted in parallel with the actuators, the selection switch of the reactive capacitance being closed and opened, by the control computer, at the same time as the selection switch of the actuator to be excited.

2. The driving device as claimed in claim 1, wherein the reactive capacitance is dimensioned to increase the capacitance of the injector/reactive capacitance assembly having to resonate with the inductance of the amplification stage and supply an AC excitation voltage with a duty cycle at least equal to 1/2.

3. A method of driving plural ultrasound piezoelectric actuators, controlled by a device as claimed in claim 1, comprising:
controlling the opening of the switch of the impedance matching branch at an instant later than an instant of cancellation of the excitation voltage of the actuators, itself later than an end-of-injection control instant, while the switch of the second stage of the driving device is longer activated, a first time interval between the instants being defined for the voltage across the terminals of the matching capacitance and the voltage across the terminals of the selected actuator to be zero or less than the excitation voltage of the actuators, the reactive capacitance retaining an almost zero charge between two injection trains of duration.

4. The method of driving plural ultrasound piezoelectric actuators as claimed in claim 3, wherein closing of the switch of the impedance matching branch must take place at an instant later than the instant of closure of the switch of the second stage of the driving device, and prior to the instant of its opening, so that the time interval between the instants depends on the technology of the switch and is determined so that the voltage across the terminals of the matching capacitance and the voltage across the terminals of the selected actuator are zero or less than the excitation voltage of the actuators, the reactive capacitance retaining an almost zero charge between two injection trains of duration.

5. The method of driving plural ultrasound piezoelectric actuators as claimed in claim 3, wherein the first time interval is defined on the basis of the instant of cancellation of the excitation voltage and a second time interval is defined on the basis of the instant of closure of the switch of the second stage of the driving device, so that the voltage across the terminals of the matching capacitance and the voltage across the terminals of the selected actuator are zero or less than the excitation voltage of the actuators, of the order of 1/10th of the latter at the end and at the start of injection respectively.

6. The method of driving plural ultrasound piezoelectric actuators as claimed in claim 5, wherein the first time interval between the instants of cancellation of the excitation voltage of the actuators and of opening of the switch of the impedance matching branch is less than 1/10th of the control period applied to the switch of the second stage of the injector driving device.

7. The driving method as claimed in claim 3 applied to driving of fuel injectors with piezoelectric stage driven by electronic injection computer of an internal combustion engine in a motor vehicle.

* * * * *